United States Patent
Naranjo et al.

(10) Patent No.: US 8,629,202 B2
(45) Date of Patent: Jan. 14, 2014

(54) PROTECTION OF A DISPERSING AGENT DURING A GRINDING OPERATION

(75) Inventors: Horacio Naranjo, Jardin (FR); Rémi Barbarulo, Voiron (FR); Christine Chaumilliat, Oullins (FR); Martin Mosquet, Bourgoin-Jallieu (FR); Marcel Rayane, Saint Quentin Fallavier (FR)

(73) Assignee: Lafarge, Paris (FR)

( * ) Notice: Subject to any disclaimer, the term of this patent is extended or adjusted under 35 U.S.C. 154(b) by 159 days.

(21) Appl. No.: 13/388,551

(22) PCT Filed: Jul. 23, 2010

(86) PCT No.: PCT/FR2010/051569
§ 371 (c)(1),
(2), (4) Date: Feb. 2, 2012

(87) PCT Pub. No.: WO2011/015761
PCT Pub. Date: Feb. 10, 2011

(65) Prior Publication Data
US 2012/0136096 A1   May 31, 2012

(30) Foreign Application Priority Data

Aug. 5, 2009 (FR) ..................... 09 03862
Dec. 4, 2009 (FR) ..................... 09 05863

(51) Int. Cl.
*C08K 3/00* (2006.01)
*C04B 40/00* (2006.01)
*C04B 24/16* (2006.01)

(52) U.S. Cl.
USPC .................................. 524/3; 524/5; 106/823

(58) Field of Classification Search
USPC .......................................... 524/3, 5; 106/823
See application file for complete search history.

(56) References Cited

U.S. PATENT DOCUMENTS

| 6,709,508 B2 | 3/2004 | Dietrich et al. |
| 6,869,476 B2 | 3/2005 | Shin et al. |

FOREIGN PATENT DOCUMENTS

| EP | 0 605 318 | | 7/1994 |
| EP | 605318 A1 | * | 7/1994 |
| FR | 2 776 285 | | 9/1999 |
| FR | 2776285 A1 | * | 9/1999 |
| FR | 2 917 401 | | 12/2008 |
| FR | 2917401 A1 | * | 12/2008 |
| WO | WO 2005/076858 A2 | | 8/2005 |
| WO | WO 2009/004348 | | 1/2009 |
| WO | WO 2009004348 A2 | * | 1/2009 |

OTHER PUBLICATIONS

Written Opinion of the International Searching Authority for PCT/FR2010/051569.
International Search Report for PCT/FR2010/051569.
Han, Seongok et al.; "Thermal/oxidative degradation and stabilization of polyethylene glycol"; Polymer, vol. 38, No. 2, 1997, pp. 317-323.

* cited by examiner

*Primary Examiner* — Michael Bernshteyn
(74) *Attorney, Agent, or Firm* — Pillsbury Winthrop Shaw Pittman LLP

(57) ABSTRACT

A method includes using a composition in the production of cement, the composition including at least one dispersing agent and at least one sacrificial molecule to partially or totally retain the properties of the dispersing agent; being either in the form of a liquid solution, or an emulsion or a suspension; the quantity of the sacrificial molecule in the composition representing at least 5% by mass of the mass of dispersing agent; and being introduced before or during the grinding of the clinker.

7 Claims, No Drawings

PROTECTION OF A DISPERSING AGENT DURING A GRINDING OPERATION

CROSS-REFERENCE TO RELATED APPLICATIONS

This is the U.S. National Stage of PCT/FR2010/051569, filed Jul. 23, 2010, which in turn claims priority to French Patent Application No. 09/03862, filed Aug. 5, 2009 and French Patent Application No. 09/05863, filed Dec. 4, 2009, the entire contents of all applications are incorporated herein by reference in their entireties.

The present invention relates to the use of a composition in the production of cement comprising at least one sacrificial molecule in order to protect the dispersing agents during the grinding operation of the clinker.

Dispersing agents are generally organic molecules, for example polymers. One of their uses may be to fluidize hydraulic compositions or other mineral charges. Practically, they are most often added to hydraulic compositions or to other mineral charges during the mixing phase, either in the mixing water or at the same time as the different components.

It may be advantageous to add the dispersing agents directly during the production of cement. The clinker is ground with calcium sulphate, which may for example, be added in the form of gypsum or anhydrite, to obtain the cement.

It is known that such dispersing agents can partially or even totally lose their fluidizing effect when used in a grinding operation. This grinding effect on the activity of the dispersing agents does not allow introducing the dispersing agents during the grinding operation in the production of cement.

In order to meet the requirements of users and ensure the efficiency of the dispersing agents, it has become necessary to find a new means to protect the dispersing agents submitted to a grinding operation in the production of cement, and to hence retain their fluidizing properties.

Therefore, the problem which the invention intends to solve is to provide a new means adapted to protect the dispersing agent against a partial or total decrease of their fluidizing property during a grinding operation in the production of cement, in other words, to partially or totally retain their fluidizing properties during the grinding operation.

Unexpectedly, the inventors have shown that it is possible to use a sacrificial molecule, for example an antioxidant, to protect the dispersing agent during the grinding operation.

With this aim the present invention provides the use of a composition in the production of cement, said composition
  comprising at least one dispersing agent and at least one sacrificial molecule to partially or totally retain the properties of the dispersing agent;
  being either in the form of a liquid solution, or an emulsion or a suspension;
  the quantity of the sacrificial molecule in the composition representing at least 5% by mass of the mass of dispersing agent; and
  being introduced before or during the grinding of the clinker.

The invention has the advantage of being able to be used in all industries using a grinding process, in particular the construction industry, the chemical industry (admixture suppliers), the cement industry, or grinding plants.

Other advantages and characteristics of the invention will clearly appear after reading the following description and examples provided for purely illustration and non-limiting purposes.

The expression <<sacrificial molecule>> is to be understood according to the present invention as a molecule which can function according to one of the two following manners in order to partially or totally retain the fluidizing properties of a dispersing agent when it is submitted to a grinding operation: either decompose instead of the dispersing agent or react with the dispersing agent in order to protect it. Preferably, the sacrificial molecule decomposes instead of the dispersing agent. A preferred sacrificial molecule is an antioxidant.

The term <<antioxidant>> is to be understood according to the present invention as a molecule adapted to capture electrons or free radicals and then to stabilise.

The term <<dispersing agent>> is to be understood according to the present invention as an organic molecule used in the field of hydraulic compositions or other mineral charges in order to fluidize the said hydraulic compositions or the said other mineral charges. A dispersing agent according to the present invention may in particular be a plasticizer/water-reducer or a superplasticizer/high water-reducer as defined in the EN 934-2 Standard in paragraphs 3.2.2 and 3.2.3. The fluidity of a hydraulic composition may in particular be evaluated by measuring the spread according to the procedure described hereinafter.

The expression <<polyoxy ethylene polycarboxylate/polyoxy propylene polycarboxylate>> or <<PCP>> is to be understood according to the present invention as a copolymer of acrylic acids and/or methacrylic acids, of their esters of polyoxy ethylene/polyoxy propylene (POE/POP) or their ethers of POE/POP. The expression <<polyoxy ethylene/polyoxy propylene>> is to be understood in the present description as polyoxy ethylene, or polyoxy ethylene and polyoxy propylene.

The term <<grinding>> is to be understood according to the present invention, as the operation consisting in dividing a solid to reduce the size of the particles and/or to increase their specific surface (developed surface of the powder per unit by mass).

The expression <<hydraulic composition>> is to be understood according to the present invention as a composition which comprises a hydraulic binder. Preferably, the hydraulic composition is a mortar or a concrete.

The expression <<hydraulic binder>>, is to be understood according to the present invention as a compound which has the property of becoming hydrated in the presence of water and the hydration of which makes it possible to obtain a solid having mechanical characteristics. Preferably, the hydraulic binder is a cement.

The term <<cement>> is to be understood according to the present invention as cements as defined in the EN 197.1 Standard and the aluminous cements. Preferably, the cement is a Portland cement.

The term <<clinker>>, is to be understood according to the present invention as the product obtained after burning (clinkerisation) of a mix (raw meal) composed of, among others, limestone and for example clay. Preferably, the clinker is a Portland clinker as defined in the NF EN 197.1 Standard.

The expression <<mineral charges>> is to be understood according to the present invention as any mineral product in the powder form, the use of which may require the presence of a dispersing agent and/or which may be used in a hydraulic composition.

The term <<emulsion>> is to be understood according to the present invention as a homogeneous mix of two liquid non-miscible substances, one substance being dispersed in the second substance in the form of little droplets the size of which is in the order of the micrometer.

The term <<suspension>> is to be understood according to the present invention as a colloidal dispersion wherein a finely divided product, in liquid or solid form, is combined with another product in liquid form, the first product being in the form of droplets or particles having a size greater than the micrometer but small enough so that the said first product does not settle quickly.

An aspect of the present invention is the use of a composition in the production of cement, said composition
- comprising at least one dispersing agent and at least one sacrificial molecule to partially or totally retain the properties of the dispersing agent
- being either in the form of a liquid solution, or an emulsion or a suspension;
- the quantity of the sacrificial molecule in the composition representing at least 5% by mass of the mass of dispersing agent; and
- being introduced before or during the grinding of the clinker.

Preferably, an aspect of the invention is the use of at least one sacrificial molecule, the said sacrificial molecule being adapted to either decompose instead of the dispersing agent or to react with the dispersing agent in order to protect it.

Preferably, the dispersing agent and the sacrificial molecule are in the form of a liquid solution.

Preferably, the dispersing agent and the sacrificial molecule are not in the form of a solid solution.

Preferably, the dispersing agent and the sacrificial molecule are not added separately. In other words, they are not added in sequence. They are preferably added simultaneously.

A variant of the aspect according to the present invention is the use of a composition in the production of cement, said composition
- comprising at least one dispersing agent and at least one sacrificial molecule to partially or totally retain the properties of the dispersing agent;
- being either in the form of a liquid solution, or an emulsion or a suspension;
- not being in the form of a powder;
- the quantity of the sacrificial molecule in the composition representing at least 5% % by mass of the mass of dispersing agent; and
- being introduced before or during the grinding of the clinker.

By way of example, in the case where the dispersing agent is submitted to a grinding operation at 100° C. for 1 hour 30 minutes, the sacrificial molecule may be present in a quantity greater than or equal to 5%, preferably 10%, more preferably 15%, most preferably 20% by dry mass relative to the dry mass of the dispersing agent.

Preferably, the sacrificial molecule is soluble in a solution of the dispersing agent.

Preferably, the sacrificial molecule is an antioxidant. The antioxidant may be a hydrogen donor, a decomposer of hydroperoxides, an alkyl radical scavenger, or a reducer in an oxidation-reduction reaction. Preferably, the antioxidant comprises a reactive group, for example an OH group or a NH group, preferably associated to a phenolic or aromatic cycle.

The antioxidant may in particular be selected from the following compounds, alone or mixed:
- hydroquinone, methoxyphenol, methoxyhydroquinone; 5-ethyl-1-aza-3,7-dioxabicyclo(3,3,0)octane; 1-aza-3,7-dioxabicyclo(3,3,0)octane-5-methanol;
- ascorbic acid, sodium ascorbates, calcium ascorbates, diacetyl 5-6-1-ascorbic acid, palmityl 6-1-ascorbic acid;

Formula 1: ascorbic acid

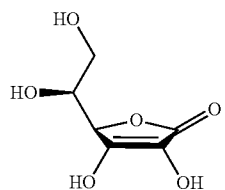

- citric acid, sodium citrates, potassium citrates and calcium citrates;

Formula 2: citric acid

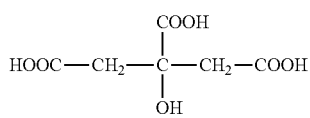

- tartric acid, sodium tartrates, potassium tartrates and sodium and potassium tartrates;

Formula 3

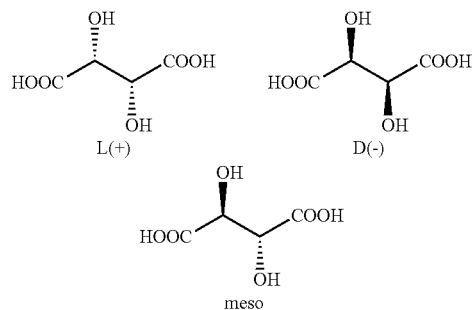

- butyl hydroxy toluol et butyl hydroxy anisol;

Formula 4: ortho and meta butyl bydroxyl toluol

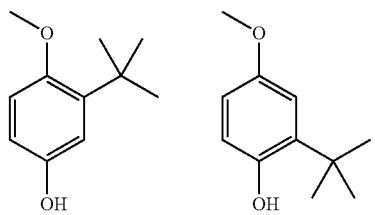

Formula 5: butyl hydroxyl anisol

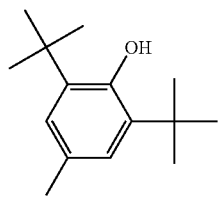

- gallic acid and its esters, for example methyl gallate, propyl gallate, octyl gallate or dodecyl gallate;

sodium lactates, potassium lactates or calcium lactates; lecithins;

natural tocopherols, synthesized alpha-tocopherol, synthesized gamma-tocopherol and synthesized delta-tocopherol;

phosphorus organic compounds for example phosphites or phosphonites, for example the following compounds:

Formula 6

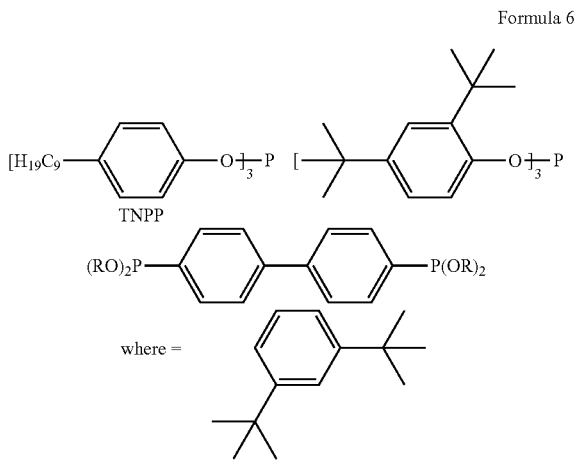

in which TNPP is tris(nonylphenyl)phosphite.

organosulfur compounds, for example the esters of 3,3-thiodipropionic acid or the esters of sulfurous acid, except salts of sulphurous acid;

hydroxylamines;

lactones, acrylic bis-phenols, substituted benzofuranones;

derivatives of 2,2,6,6-tetramethyl piperidine sebacate:

Formula 7

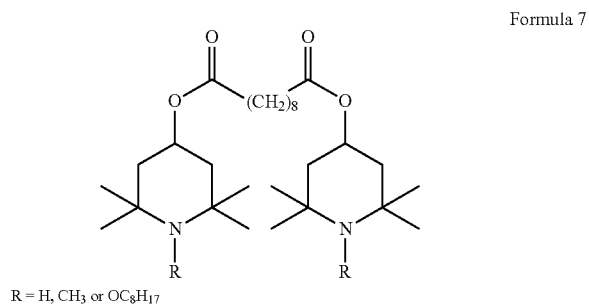

R = H, CH$_3$ or OC$_8$H$_{17}$

Preferably, the sacrificial molecule is selected from phenols, polyphenols, phenolic acids and their associated esters, secondary aromatic amines, organophosphorous compounds, organosulfurous compounds except salts of sulphurous acid, organic acids and their associated esters, hydroxylamines, reducers of oxidation-reduction reactions, their associated salts and mixtures thereof.

In particular, the sacrificial molecule is preferably selected from phenols, polyphenols, phenolic acids and their associated esters, secondary aromatic amines, hydroxylamines, their associated salts and mixtures thereof.

Preferably, the sacrificial molecule is selected from hydroquinone, methyl gallate, propyl gallate, gallic acid and hydroxylamine.

Preferably, the sacrificial molecule is 4-methoxyphenol or also called MEHQ.

According to a variant, another aspect of the invention is the use of a composition in the production of cement, said composition comprising at least one dispersing agent and at least 4-methoxyphenol to partially or totally retain the properties of the dispersing agent;

being either in the form of a liquid solution, or an emulsion or a suspension;

the quantity of the sacrificial molecule in the composition representing at least 5% by mass of the mass of dispersing agent; and being introduced before or during the grinding of the clinker.

Preferably, the dispersing agent is selected from polyoxy ethylene/polyoxy propylene polycarboxylates, poly naphtalene sulfonates, lignosulfonates, polymelamines sulfonates and mixtures thereof. In particular, the dispersing agent is preferably a polyoxy ethylene polycarboxylate.

According to a variant of the invention, the dispersing agent may be used in liquid form, the sacrificial molecule may be used in powder or liquid form and the sacrificial molecule may be soluble in a solution of the dispersing agent. The solubility of the sacrificial molecule in a solution of the dispersing agent provides a homogeneous mixing of these two compounds which are then in the form of a liquid solution.

According to another variant of the invention, the sacrificial molecule may not be soluble in a solution of the dispersing agent, and the dispersing agent and the sacrificial molecule may be used in the form of an emulsion or of a suspension. In order to obtain a stable emulsion/suspension, it is possible to further use a stabilizer.

According to another variant of the invention, it is possible to copolymerize the sacrificial molecule and the dispersing agent, in order to directly integrate the sacrificial molecule in the skeleton of the dispersing agents. The sacrificial molecule and the dispersing agent may be copolymerised. In particular when the dispersing agent is a polymer, it may then be possible to graft the sacrificial molecule onto this polymer. This grafting may be carried out during the synthesis of the polymer, for example by radical polymerisation. Antioxidant monomers may then be integrated by radical copolymerisation in a structure of the PCP type. For example, the monomers may be selected from the molecules described in Table 1 herein below

TABLE 1

| | antioxidant monomers | | |
|---|---|---|---|
| Name | Abréviation | Molécule | Molar mass |
| 2,2,6,6-tetramethyl-4-piperidinyle methacrylate | TAA-OL | | 271 g/mol |

TABLE 1-continued antioxidant monomers

| Name | Abréviation | Molécule | Molar mass |
|---|---|---|---|
| 2-(4 benzoyl 3 hydroxyphenoxy) éthyl acrylate | BHPA | | 313 g/mol |
| 2-(3-(2H-benzotriazol-2yl)-4-hydroxyphenyl)ethyl methacrylate | BTHPMa | | 323 g/mol |
| 4 allyloxy 2 hydroxybenzophenone | AHBP | | 254 g/mol |

The dispersing agent may comprise one or more types of dispersing agents. Likewise, the sacrificial molecule may comprise one or more types of sacrificial molecules.

Other typical admixtures may also be used with the dispersing agent and the sacrificial molecule, for example a setting accelerator, a setting retarder or an anti-foaming agent.

Preferably, the quantity of sacrificial molecule is at least 5%, more preferably at least 10%, even more preferably at least 15% by dry mass relative to the dry mass of the dispersing agent.

Preferably, the quantity of sacrificial molecule is less than or equal to 40%, more preferably less than or equal to 20%, by dry mass relative to the dry mass of the dispersing agent.

Preferably, the concentration of the mix comprising the sacrificial molecule and the dispersing agent in a cement is from 0.05 to 5% by mass relative to the mass of cement.

It is to be noted that the dosage of sacrificial molecule relative to the dispersing agent to be protected may depend on the nature of the sacrificial molecule and on the nature of the dispersing agent.

According to a particular embodiment of the invention, the composition comprising at least one sacrificial molecule and at least one dispersing agent may be used during the production of cement, said cement comprising mineral additions, to partially or totally retain the properties of the dispersing agent. According to this variant, the mineral additions are added during the production of the cement before or during the grinding of the clinker.

The expression <<mineral additions>>, is to be understood according to the invention as slags (as defined in the <<Cement>> NF EN 197-1 Standard, paragraph 5.2.2), steel industry slags, pozzolanic materials (as defined in the <<Cement>> NF EN 197-1 Standard, paragraph 5.2.3), fly ash (as defined in the <<Cement>> NF EN 197-1 Standard, paragraph 5.2.4), calcined shale (as defined in the <<Cement>> NF EN 197-1 Standard, paragraph 5.2.5), limestones (as defined in the <<Cement>> NF EN 197-1 Standard, paragraph 5.2.6), or silica fume (as defined in the <<Cement>> NF EN 197-1 Standard, paragraph 5.2.7) or mixtures thereof.

Preferably, the quantity of mineral additions comprised with the clinker is from 10 to 70% of mineral additions, more preferably from 10 to 60%, even more preferably from 10 to 50%, % by mass relative to the total mass of clinker.

Another aspect according to the invention is the use of a cement with the composition as described herein above for the production of a hydraulic composition. Another aspect according to the invention is the use of a mineral charge as described herein above for the production of a hydraulic composition. Within the scope of these two uses according to the invention, the sacrificial molecule and the dispersing agent have the same characteristics as those described in relation to the first use according to the invention.

Measurement of the Spread and Rheology Monitoring

The spread of a mortar is measured using a mini Abrams cone, the volume of which is 800 mL. The dimensions of the cone are the following:

top circle diameter: 50+/−0.5 mm;

bottom circle diameter: 100+/−0.5 mm;

height: 150+/−0.5 mm.

The cone is placed on a dry glass plate and filled with fresh mortar. It is then levelled. A slump of the mortar on the glass plate is provoked by lifting the cone. The diameter of the obtained disk is measured in millimeters+/−5 mm. This is the spread of the mortar.

These operations, repeated at several intervals (5, 15 and 30 minutes), make it possible to monitor the rheological evolution of the mortar for 30 minutes.

The following examples illustrate the invention without limiting its scope.

EXAMPLES

Example 1

Validation of the Effect of the Sacrificial Molecules on the Decrease of the Fluidizing Power of Different Dispersing Agents During the Production of Cements During their Grinding Operation Different mortars were made and their rheologies were measured. These mortars were made with either a cement comprising the composition used according to the invention (that is to say, the composition is added during the grinding of the clinker), or they were made with a typical cement, the dispersing agent and optionally the sacrificial molecule having been added into the mortar (control).

The dispersing agents which were tested are PCPs, and in particular a PCP coming from a laboratory synthesis having 30% content of MMPEG 1100 ester (methoxy polyethylene glycol methacrylate having a molar mass of 1100 g/mol), a PCP coming from a laboratory synthesis having 20% content of MMPEG 1100, Premia 180 (supplier: Chryso), Premia 196 (supplier: Chryso), Optima 200 (supplier: Chryso) and Optima 203 (supplier: Chryso).

The PCPs coming from a laboratory synthesis which were tested in the different examples of the present description were synthesized by radical polymerisation in water between the methacrylic acid and the methoxy polyethylene glycol methacrylate having a molar mass of 1100 g/mol. Depending on the desired content of ester, the initial quantities of the two monomers were modified.

The reactants used in the present test and their quantities were the following:
- methacrylic acid (AM) (supplier: Aldrich): 63.0 g
- methoxy polyethylene glycol methacrylate (MMPEG1100) (supplier: Aldrich): 341.7 g
- azoic initiator (AIBN azobis(isobutyronitrile)—supplier: Dupont—Vazo 64): 3.435 g
- transfer agent: thioglycolic acid (ATG—supplier: Aldrich): 5.780 g
- solvent: water: 553.6 g The operating procedure for the production of the tested PCPs was the following:
- introduce the monomers (AM and MMPEG1100) into the flask;
- place the cooling device above the flask;
- begin heating to reach a temperature of 70° C.;
- degass using nitrogen for 30 minutes;
- when the initial temperature is reached, add the transfer agent (ATG) then the initiator (AIBN);
- maintain a flux of nitrogen;
- leave to react at 70° C. for 2 hours;
- stop the heating and leave to cool;
- begin the neutralisation when the temperature drops below 30° C. (32.51 g of Ca(OH)$_2$);
- filter on a filter having pores with a maximum diameter of 80 μm.

The sacrificial molecules tested in the present example were methyl gallate, propyl gallate, hydroquinone, hydroxylamine and gallic acid (supplier: Aldrich), 4-methoxyphenol (supplier ECEM).

The cement was ground according to the procedure described herein below. The grinder which was used was a grinder capable of containing 5 kg of material to be ground and having 60 kg of metal balls, by the order of 27 kg of balls, the average diameter of which was between 40 and 60 mm, 18 kg of balls, the average diameter of which was between 25 and 35 mm et 15 kg of balls, the average diameter of which was between 20 and 25 mm. The grinder was used at a speed of 40 rpm. The grinding steps were the following:
- introduction in a grinder of 4727.1 g of Portland clinker in the form of pellets with a maximum diameter less than or equal to 3.15 mm, either at ambient temperature for grinding at 20° C., or heated beforehand to 115° C. for grinding at 100° C.;
- spraying of the dispersing agent alone or of the composition used according to the invention (dispersing agent+ sacrificial molecule) on the clinker;
- grinding for 500 revolutions, then opening of the grinder and temperature control of the clinker;
- grinding for 500 revolutions, then temperature control and control of the clinker's Blaine specific surface according to the EN 196-6 Standard;
- grinding for 800 revolutions, then temperature control and control of the clinker's Blaine specific surface according to the EN 196-6 Standard;
- introduction of gypsum and hemi-hydrate 60%/40% in mass proportion, i.e. 174.77 g of gypsum and 98.09 g of hemi-hydrate;
- grinding for 800 revolutions, then temperature control and control of the clinker's Blaine specific surface according to the EN 196-6 Standard;
- grinding for 250 revolutions, then temperature control and control of the clinker's Blaine specific surface according to the EN 196-6 Standard;
- installation of the draining grid in order to recover the cement having the desired size of particles from the last grinding revolutions;
- grinding for 400 revolutions;
- homogenisation of the ground cement in a 15-liter Turbula for 20 minutes at 24 rpm;
- last control of the clinker's Blaine specific surface according to the EN 196-6 Standard.

After the grinding the cement was used for the production of a mortar, for which the rheology was monitored in order to highlight the effect of the sacrificial molecule.

The formulation of the tested mortar was the following:

| | |
|---|---|
| Water/Cement | 0.62 |
| Total cement | 404.4 g |
| ISO sand | 1350.0 g |
| Total water | 252.5 g |
| Pre-wetting water | 81.0 g |
| Mixing water | 171.5 g |

The cement was a CEM 152.5 N cement.

The ISO sand was a siliceous sand (supplier: Societe Nouvelle du Littoral).

The tested mortar was produced according to the procedure described herein after:
1) introduction of the ISO sand in the bowl of a Perrier mixer;
2) from 0 to 30 seconds: start mixing at low speed (140 rpm) and introduction of the pre-wetting water in 30 seconds;
3) from 30 seconds to 1 minute, mixing of the sand and the pre-wetting water for 30 seconds;
4) from 1 minute to 5 minutes, rest for 4 minutes;
5) from 5 minutes to 6 minutes, introduction of the cement;

6) from 6 minutes to 7 minutes, mixing for 1 minute at low speed;
7) from 7 minutes to 7 minutes and 30 seconds, introduction of the mixing water whilst mixing at low speed;
8) from 7 minutes and 30 seconds to 9 minutes and 30 seconds, mixing for 2 minutes at high speed (280 rpm).

Tables 1 and 2 herein after give the results of the tests carried out with different sacrificial molecules. The composition used according to the invention comprising at least one sacrificial molecule and at least one dispersing agent was either added during the grinding of a clinker or added to a mortar (control).

TABLE 1

Summary of the spread tests carried out during the grinding operation at 20° C. of a clinker compared to a control, corresponding to the addition to a mortar of the composition used according to the invention

| Admixture | | | | | | | |
|---|---|---|---|---|---|---|---|
| | | | Dosage D + SM | Mode of | Spread (mm) | | |
| | | SM/D | (mass ppm relative | introduction of | | | |
| D | SM | (% mass) | to the cement) | the admixture | 5 min | 15 min | 30 min |
| PCP 30% ester MMPEG 1100 | — | — | 1000 | Control | 320 | 295 | 280 |
| | | | | Addition before grinding | 220 | 195 | 175 |
| PCP 30% ester MMPEG 1100 | Hydroquinone | 10 | 1100 | Control | 310 | 295 | 280 |
| | | | | Addition before grinding | 245 | 215 | 210 |
| PCP 30% ester MMPEG 1100 | Hydroquinone | 20 | 1200 | Control | 330 | 300 | 280 |
| | | | | Addition before grinding | 245 | 220 | 205 |
| PCP 30% ester MMPEG 1100 | Methyl gallate | 10 | 1100 | Control | 300 | 270 | 260 |
| | | | | Addition before grinding | 275 | 260 | 225 |
| PCP 30% ester MMPEG 1100 | Methyl gallate | 20 | 1200 | Control | 320 | 270 | 250 |
| | | | | Addition before grinding | 280 | 250 | 220 |
| PCP 30% ester MMPEG 1100 | Methyl gallate | 30 | 1300 | Control | 305 | 280 | 260 |
| | | | | Addition before grinding | 275 | 260 | 240 |
| PCP 30% ester MMPEG 1100 | Propyl gallate | 20 | 1200 | Control | 300 | 250 | — |
| | | | | Addition before grinding | 285 | 265 | 240 |

D = dispersing agent
SM = Sacrificial Molecule

According to Table 1 herein above, the effect of the different sacrificial molecules has been shown because the fluidizing power of the PCP submitted to grinding at 20° C. is improved by the presence of a sacrificial molecule. For example, the spread at 5 minutes of a mortar comprising a PCP alone, submitted to grinding at 20° C. was 220 mm, while it was 275 mm in the presence of 10% of methyl gallate, or 285 mm in the presence of 20% of propyl gallate.

TABLE 2

Summary of the spread tests carried out during the grinding operation at 100° C. of a clinker compared to a control, corresponding to the addition to a mortar of the composition used according to the invention

| Admixture | | | | | | | |
|---|---|---|---|---|---|---|---|
| | | | Dosage D + SM | Mode of | Spread (mm) | | |
| | | SM/D | (mass ppm relative | introduction of | | | |
| D | SM | (% dry mass) | to the cement) | the admixture | 5 min | 15 min | 30 min |
| PCP 30% ester MMPEG 1100 | — | — | 1000 | Control | 290 | 280 | 255 |
| | | | | Addition before grinding | 200 | 180 | 165 |
| PCP 30% ester MMPEG 1100 | Hydroquinone | 10 | 1100 | Control | 270 | 280 | 270 |
| | | | | Addition before grinding | 245 | 235 | 225 |
| PCP 30% ester MMPEG 1100 | Hydroquinone | 20 | 1200 | Control | 285 | 275 | 260 |
| | | | | Addition before grinding | 265 | 240 | 230 |
| PCP 30% ester MMPEG 1100 | Methyl gallate | 10 | 1100 | Control | 300 | 300 | 280 |
| | | | | Addition before grinding | 265 | 245 | 210 |

TABLE 2-continued

Summary of the spread tests carried out during the grinding operation at 100° C. of a clinker compared to a control, corresponding to the addition to a mortar of the composition used according to the invention

| Admixture | | | | | Spread (mm) | | |
|---|---|---|---|---|---|---|---|
| D | SM | SM/D (% dry mass) | Dosage D + SM (mass ppm relative to the cement) | Mode of introduction of the admixture | 5 min | 15 min | 30 min |
| PCP 30% ester MMPEG 1100 | Methyl gallate | 20 | 1200 | Control | 305 | 300 | 295 |
| | | | | Addition before grinding | 285 | 275 | 260 |
| PCP 30% ester MMPEG 1100 | Methyl gallate | 30 | 1300 | Control | 330 | 325 | 315 |
| | | | | Addition before grinding | 270 | 255 | 220 |
| PCP 30% ester MMPEG 1100 | Propyl gallate | 10 | 1100 | Control | 300 | 290 | 260 |
| | | | | Addition before grinding | 250 | 245 | 225 |
| PCP 30% ester MMPEG 1100 | Propyl gallate | 20 | 1200 | Addition before grinding | 320 | 300 | — |
| | | | | Addition before grinding | 295 | 280 | 265 |
| PCP 30% ester MMPEG 1100 | Propyl gallate | 30 | 1300 | Addition before grinding | 310 | 285 | 260 |
| | | | | Addition before grinding | 275 | 265 | 245 |
| PCP 30% ester MMPEG 1100 | Gallic acid | 10 | 1100 | Addition before grinding | 310 | 290 | 265 |
| | | | | Addition before grinding | 260 | 250 | 235 |
| PCP 30% ester MMPEG 1100 | Gallic acid | 20 | 1200 | Addition before grinding | 310 | 295 | 270 |
| | | | | Addition before grinding | 265 | 260 | 245 |
| PCP 30% ester MMPEG 1100 | Gallic acid | 30 | 1300 | Addition before grinding | 310 | 300 | 270 |
| | | | | Addition before grinding | 270 | 265 | 255 |
| PCP 30% ester MMPEG 1100 | Hydroxylamine | 10 | 1100 | Addition before grinding | 310 | 295 | 275 |
| | | | | Addition before grinding | 265 | 250 | 240 |
| PCP 30% ester MMPEG 1100 | Hydroxylamine | 20 | 1200 | Addition before grinding | 305 | 295 | 265 |
| | | | | Addition before grinding | 250 | 235 | 220 |
| PCP 30% ester MMPEG 1100 | Hydroxylamine | 30 | 1300 | Addition before grinding | 310 | 300 | 275 |
| | | | | Addition before grinding | 250 | 240 | 210 |

D = dispersing agent

SM = Sacrificial Molecule

According to Table 2 herein above, the effect of the different sacrificial molecules has been shown because the fluidizing power of the PCP submitted to grinding at 100° C. improved by the presence of a sacrificial molecule. For example, the spread at 5 minutes of a mortar comprising a PCP alone, submitted to grinding at 100° C. was 200 mm, while it was 270 mm in the presence of 30% of gallic acid, or 265 mm in the presence of 10% of hydroxylamine.

Table 3 herein after gives the results of the spread tests carried out with different sacrificial molecules. The composition used according to the invention comprising at least one sacrificial molecule and at least one dispersing agent was either added during the grinding of a clinker or added to a mortar (control).

TABLE 3

Summary of the spread tests carried out during the grinding operation at 100° C. of a clinker compared to a control, corresponding to the addition to a mortar of the composition used according to the invention

| | Admixture | | | | | | |
|---|---|---|---|---|---|---|---|
| | | SM/D | Dosage D + SM (mass ppm relative | Mode of introduction of | Spread (mm) | | |
| D | SM | (% dry mass) | to the cement) | the admixture | 5 min | 15 min | 30 min |
| Premia 180 | — | — | 1000 | Control | 330 | 290 | 270 |
| | | | | Addition before grinding | 210 | 185 | — |
| Premia 180 | Methyl gallate | 20 | 1200 | Control | 335 | 295 | 270 |
| | | | | Addition before grinding | 275 | 245 | — |
| Premia 196 | — | — | 1000 | Control | 335 | 320 | 305 |
| | | | | Addition before grinding | 195 | — | — |
| Premia 196 | Methyl gallate | 20 | 1200 | Control | 345 | 335 | 305 |
| | | | | Addition before grinding | 245 | 230 | 210 |
| PCP 20% ester MMPEG 1100 | — | — | 1000 | Control | 310 | 270 | 203 |
| | | | | Addition before grinding | 220 | 215 | 200 |
| PCP 20% ester MMPEG 1100 | Methyl gallate | 20 | 1200 | Control | 300 | 260 | — |
| | | | | Addition before grinding | 255 | 250 | 220 |
| Optima 200 | — | — | 1000 | Control | 280 | 275 | 245 |
| | | | | Addition before grinding | 220 | 205 | 190 |
| Optima 200 | Methyl gallate | 20 | 1200 | Addition before grinding | 275 | 280 | 265 |
| | | | | Addition before grinding | 255 | 245 | 235 |
| Optima 203 | — | — | 1000 | Addition before grinding | 265 | 280 | 260 |
| | | | | Addition before grinding | 205 | 205 | 195 |
| Optima 203 | Methyl gallate | 20 | 1200 | Addition before grinding | 260 | 280 | 265 |
| | | | | Addition before grinding | 250 | 260 | 245 |

D = Dispersing agent
SM = Sacrificial Molecule

According to Table 3 herein above, the effect of a sacrificial molecule has been shown on 5 different dispersing agents. The fluidizing power of the tested dispersing agents submitted to grinding at 100° C. indeed improved by the presence of a sacrificial molecule. For example, the spread at 5 minutes of a mortar comprising Premia 180 submitted to grinding at 100° C. in the absence of a sacrificial molecule was 210 mm, whilst it was 275 mm in the presence of 20% of methyl gallate. Likewise, the spread at 5 minutes of a mortar comprising a PCP having 20% content of MMPEG 1100 ester submitted to grinding at 100° C. in the absence of a sacrificial molecule was 220 mm, whilst it was 255 mm in the presence of 20% of methyl gallate.

Example 2

Validation of the Dosage of Sacrificial Molecules on the Decrease of the Fluidizing Power of Different Dispersing Agents During the Production of Cements During their Grinding Operation The cement was ground according to the procedure described herein below. The grinder which was used was a grinder capable of containing 5 kg of material to be ground and having 60 kg of metal balls, by the order of 27 kg of balls, the average diameter of which was between 40 and 60 mm, 18 kg of balls, the average diameter of which was between 25 and 35 mm et 15 kg of balls, the average diameter of which was between 20 and 25 mm. The grinder was used at a speed of 40 rpm. The grinding steps were the following:

introduction in a grinder of 4727.1 g of Portland clinker in the form of pellets with a maximum diameter less than or equal to 3.15 mm, either at ambient temperature for grinding at 20° C., or heated beforehand to 115° C. for grinding at 100° C.;

spraying of the dispersing agent alone or of the composition used according to the invention (dispersing agent+ sacrificial molecule) on the clinker;

grinding for 1650 revolutions, then opening of the grinder and temperature control of the clinker;

introduction of gypsum and hemi-hydrate 60%/40% in mass proportion, i.e. 174.77 g of gypsum and 98.09 g of hemi-hydrate;

grinding for 1000 revolutions, then temperature control and control of the clinker's Blaine specific surface according to the EN 196-6 Standard;

installation of the draining grid in order to recover the cement having the desired size of particles from the last grinding revolutions;

grinding for 400 revolutions;

homogenisation of the ground cement in a 15-liter Turbula for 20 minutes at 24 rpm;

last control of the clinker's Blaine specific surface according to the EN 196-6 Standard.

After the grinding the cement was used for the production of a mortar (identical to the one in Example 1), for which the rheology was monitored in order to highlight the effect of the sacrificial molecule.

Table 4 herein after gives the results of the spread tests carried out with different dispersing agents. The composition used according to the invention comprising at least one sacrificial molecule and at least one dispersing agent was either added during the grinding of a clinker or added to a mortar (control).

TABLE 4

Summary of the spread tests carried out during the grinding operation at 100° C. of a clinker compared to a control, corresponding to the addition to a mortar of the composition used according to the invention

| Admixture | | | | | | | |
|---|---|---|---|---|---|---|---|
| D | SM | SM/D (% dry mass) | Dosage D + SM (mass ppm relative to the cement) | Mode of introduction of the admixture | Spread (mm) | | |
| | | | | | 5 min | 15 min | 30 min |
| Optima 203 | — | — | 1000 | Control | 280 | 285 | 275 |
| | | | | Addition before grinding | 250 | 235 | 215 |
| Optima 203 | MEHQ | 1 | 1010 | Addition before grinding | 235 | 230 | 225 |
| Optima 203 | MEHQ | 2 | 1020 | Addition before grinding | 235 | 225 | 220 |
| Optima 203 | MEHQ | 5 | 1050 | Addition before grinding | 240 | 250 | 250 |
| Optima 203 | Propyl gallate | 20 | 1200 | Addition before grinding | 265 | 275 | 255 |
| SH3 | — | | 1000 | Control | 250 | 270 | 245 |
| | | | | Addition before grinding | 235 | 220 | 220 |
| SH3 | MEHQ | 5 | 1050 | Addition before grinding | 220 | 200 | 195 |
| SH3 | MEHQ | 10 | 1100 | Addition before grinding | 245 | 235 | 225 |

According to table 4, the minimum dosage of sacrificial molecule to ensure protection of the dispersing agent during a grinding operation of clinker was at least 5%. The best efficiency was obtained for a dosage comprised from 10 to 20%.

Example 3

Table 5 herein after gives the results of the spread tests carried out on different forms of use of the dispersing agent and of the sacrificial molecule: liquid solution, suspension of the sacrificial molecule in the dispersing agent and separate addition, during a grinding operation at 100° C.

transfer agent: thioglycolic acid (ATG—supplier: Aldrich): 0.13 g
solvent: THF: 35.1 g—Toluene: 1.2 g

TABLE 5

Summary of the tests carried out to validate the form of use of the sacrificial molecule and of the dispersing agent during a grinding operation at 100° of a clinker, and their results

| | Admixture | | | | Spread (mm) | | |
|---|---|---|---|---|---|---|---|
| D (=dispersing agent) | SM (=sacrificial molecule) | SM/D (% dry mass) | Dosage D + SM mass ppm relative to the cement) | Mode of introduction of the admixture | 5 min | 15 min | 30 min |
| Optima 203 | — | — | 1000 | Control | 265 | 280 | 260 |
| | | | | Addition before grinding | 205 | 205 | 195 |
| Optima 203 | Methyl gallate | 20 | 1200 | Addition of solution before grinding | 250 | 260 | 245 |
| Optima 203 | Methyl gallate | 20 | 1200 | Addition of suspension before grinding | 230 | 240 | 240 |
| Optima 203 | Methyl gallate | 20 | 1200 | Separate addition before grinding | 200 | 210 | 205 |

According to Table 5 herein above, the sacrificial molecule and the dispersing agent must be in contact with each other before being used. The fluidizing power of the dispersing agent submitted to grinding at 100° C. indeed improved by the presence of a sacrificial molecule and of a dispersing agent which were either in the form of a solution or in the form of a suspension before being added to the cement. For example, the spread at 5 minutes of a mortar comprising Optima 203 submitted to grinding at 100° C. in the absence of a sacrificial molecule was 205 mm, whilst it was 250 mm in the presence of 20% of methyl gallate in solution with the dispersing agent, or 230 mm in the presence of 20% of methyl gallate in suspension with the dispersing agent. In contrast, the spread at 5 minutes of a mortar comprising Optima 203 submitted to grinding at 100° C. in the presence of 20% of methyl gallate, the dispersing agent and the sacrificial molecule being added separately to the cement was 200 mm, a value very close to the 205 mm value of the mortar ground without a sacrificial molecule.

Example 4

Validation of the Effect of the Sacrificial Molecules on the Decrease of the Fluidizing Power of Different Dispersing Agents During the Production of Cements During their Grinding Operation, the Dispersing Agents Being Prepared by Copolymerisation Copolymer 1 containing the sacrificial molecule TAA-OL was prepared with the following reactants:
methacrylic acid (AM) (supplier: Aldrich): 3.1 g
methoxy polyethylene glycol methacrylate (MMPEG1100) (supplier: Aldrich): 19.7 g
antioxidising monomer: 2,2,6,6-tetramethyl-4 piperidinyl methacrylate (TAA-OL) (supplier: Evonik Industries): 1.7 g
azoic initiator (AIBN azobis(isobutyronitrile)—supplier: Dupont—Vazo 52): 0.30

The following operating procedure was used for the production of the tested PCPs:
introduce the solvents and the monomers in the reactor;
place the cooling device above the reactor;
begin the heating to reach a temperature of 60° C.;
degass using nitrogen for 30 minutes;
when the initial temperature is reached, add the transfer agent (ATG) then the initiator (AIBN);
maintain a flux of nitrogen;
leave to react at 60° C. for 5 hours;
stop the heating and leave to cool;
let the solvents evaporate in the rotary evaporator;
filter on a filter having pores with a maximum diameter of 80 μm.

Copolymers 2 to 5 were prepared according to the same operating procedure by replacing the TAA-OL with the monomer to be tested according to the molar percentages given in Table 6:

TABLE 6 composition of the copolymers containing the antioxidant in the polymer chain.

| Name | Length of the PEG chain | Molar % MPEG | Molar % AmA | AOx | Molar % AOx |
|---|---|---|---|---|---|
| Copolymer 1 | 1100 | 30 | 60 | TAA-OL | 10 |
| Copolymer 2 | 1100 | 30 | 50 | BHPA | 20 |
| Copolymer 3 | 1100 | 30 | 65 | BHPA | 5 |
| Copolymer 4 | 2000 | 20 | 70 | BHPA | 10 |
| Copolymer 5 | 1100 | 30 | 60 | BTHPMa | 10 |

Table 7 herein below, gives the results of the spread tests carried out using different dispersing copolymers. The copolymer used according to the invention comprising at least one monomer with an antioxidant was either added during the grinding operation of a clinker or added to a mortar (control).

TABLE 7

Summary of the spread tests carried out during the grinding operation at 100° C. of a clinker compared to a control, corresponding to the addition to a mortar of the composition used according to the invention

| Admixture | | | Dosage D + SM (mass ppm relative to the cement) | Mode of introduction of the admixture | Spread (mm) | | |
|---|---|---|---|---|---|---|---|
| D | SM | Molar % | | | 5 min | 15 min | 30 min |
| PCP 30% ester MMPEG 1100 | — | — | 1000 | Control | 320 | 295 | 280 |
| | | | | Addition before grinding | 220 | 195 | 175 |
| PCP 30% ester MMPEG 1100 | TAA-OL | 10 | | Control | 280 | 295 | 275 |
| | | | | Addition before grinding | 235 | 250 | 245 |
| PCP 30% ester MMPEG 1100 | BHPA | 20 | 1200 | Control | 265 | 275 | 265 |
| | | | | Addition before grinding | 235 | 235 | 220 |
| PCP 30% ester MMPEG 1100 | BHPA | 5 | 1200 | Control | 265 | 265 | 250 |
| | | | | Addition before grinding | 250 | 250 | 250 |
| PCP 30% ester MMPEG 1100 | BHPA | 10 | | Control | 250 | 235 | 220 |
| | | | | Addition before grinding | 220 | 200 | 185 |
| PCP 30% ester MMPEG 1100 | BTHPMa | 10 | 1100 | Control | 295 | 285 | 270 |
| | | | | Addition before grinding | 245 | 235 | — |

According to Table 7, it can be seen that the copolymer containing the antioxidant in the polymer chain retained all or part of its fluidizing property compared to the PCP 30% ester MMPEG 1100 not containing the antioxidant which lost all its fluidizing property.

The invention claimed is:

1. A method comprising using a composition in the production of cement, said composition
   comprising at least one dispersing agent and at least one sacrificial molecule to partially or totally retain the properties of the dispersing agent;
   being either in the form of a liquid solution, or an emulsion or a suspension;
   the quantity of the sacrificial molecule in the composition representing at least 5% by mass of the mass of dispersing agent; and
   being introduced before or during grinding of a clinker to be used to produce the cement.

2. The method according to claim 1, wherein the composition is a liquid solution.

3. The method according to claim 1, wherein the sacrificial molecule is selected from antioxidants.

4. The method according to claim 3, wherein the sacrificial molecule is selected from the group consisting of phenols, polyphenols, phenolic acids and their associated esters, secondary aromatic amines, hydroxylamines, their associated salts and mixtures thereof.

5. The method according to claim 4, wherein the sacrificial molecule is 4-methoxyphenol.

6. The method according to claim 1, wherein the quantity of sacrificial molecule in the composition is less than or equal to 50% by mass relative to the mass of the dispersing agent.

7. The method according to claim 1, wherein the sacrificial molecule and the dispersing agent have been copolymerized.

* * * * *